March 18, 1924.  1,487,013
W. E. CLIFTON
DIAPHRAGM FOR SOUND RECORDING AND SOUND REPRODUCING INSTRUMENTS
Filed Nov. 12, 1921
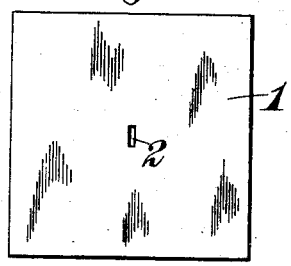
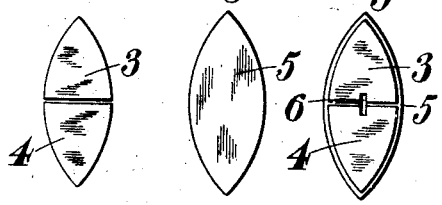
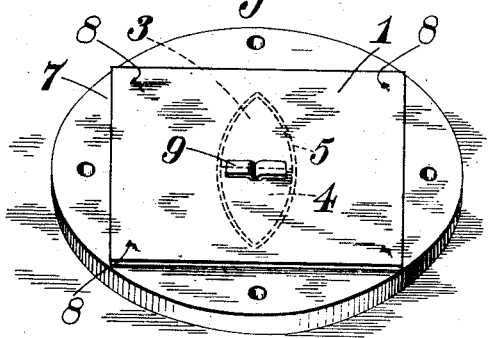
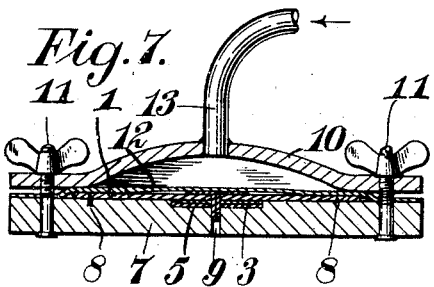
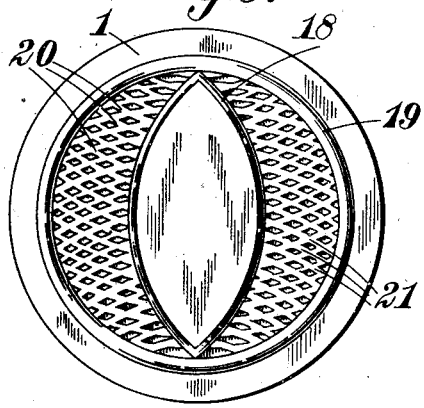
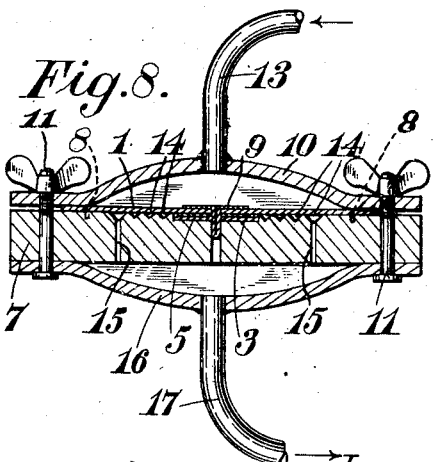
Inventor
William Ernest Clifton Patented Mar. 18, 1924.

1,487,013

UNITED STATES PATENT OFFICE.

WILLIAM ERNEST CLIFTON, OF NOTTINGHAM, ENGLAND, ASSIGNOR TO CLIFTOPHONE LIMITED, OF LONDON, ENGLAND.

DIAPHRAGM FOR SOUND-RECORDING AND SOUND-REPRODUCING INSTRUMENTS.

Application filed November 12, 1921. Serial No. 514,591.

*To all whom it may concern:*

Be it known that I, WILLIAM ERNEST CLIFTON, subject of the King of England, residing in Nottingham, England, have invented certain new and useful Improvements in Diaphragms for Sound-Recording and Sound-Reproducing Instruments, of which the following is a specification.

This invention consists in improvements in or relating to diaphragms for sound-recording and sound-reproducing instruments, such for example as gramophones or like apparatus, and refers particularly to an improved method and apparatus for forming the diaphragm and to the product of such method and/or apparatus.

The type of diaphragm to which the present invention relates is that composed or built up of two or more layers of material. One example of diaphragm of this type is described in my co-pending application Ser. No. 479,379 in which flexible and substantially non-resilient, or only slightly resilient, material has a stiffened portion, for example of paper, secured to it and disposed in the middle, or partly in the middle, of the diaphragm. It has been hitherto proposed to secure the portions of the built-up diaphragm together by means of an adhesive.

According to the present invention a method of manufacturing a built-up diaphragm, composed of two or more layers of material, consists in assembling the layers with or without an adhesive coating between them, applying heat and pressure to them to cause them to adhere together and thereafter cooling the parts while the pressure is maintained. If the materials are such that by the application of heat and pressure the layers will adhere together, an adhesive will not necessarily be employed. The layers of material may comprise, for example, a disc of celluloid, a stiffening-blade or part, for example of paper, a covering of celluloid for the stiffening-blade or part so that the latter is enclosed between two sheets of celluloid with or without an additional stiffening-strip for that portion of the blade or part in the region of it at which the stylus-bar is connected.

The process may be modified according to the present invention by first corrugating a celluloid or other disc by moulding it under heat and pressure, thereafter assembling it with a superimposed layer or layers of material, with or without an adhesive coating between the layers, subjecting the composite diaphragm thus provided to heat and pressure to cause the layers to adhere together, and thereafter cooling the parts while the pressure is maintained. Preferably in such a method for the corrugation of the celluloid the pressure is obtained by applying compressed fluid, such as compressed air, directly on to the surface of the diaphragm material.

The invention also includes apparatus comprising a disc-like mould-plate or other preferred mould-base, a cover therefor, means to hold the two parts together at their margins, and means for introducing fluid pressure into the space between the two parts of the mould. The mould-base or disc may be plain or corrugated according as to whether it is to be used for corrugating the diaphragm or otherwise.

One preferred method of and apparatus for carrying the invention into effect will now be described by way of example only, with the aid of the accompanying drawings, in which—

Figures 1, 3 and 5 illustrate respectively the several parts of the composite diaphragm;

Figure 4 shows the stiffening-strips and cover in assembled relationship;

Figure 6 illustrates the composite diaphragm placed on the mould-base in readiness for the application of the mould-cover;

Figure 7 is a central section through the assembled mould and composite diaphragm for the first operation;

Figure 8 is a similar view of the parts necessary for the second operation; and

Figure 9 illustrates the form of corrugation which it is preferred to apply to the diaphragm.

Like reference numerals indicate like parts in the several figures of the drawings.

A rectangular, preferably square, strip of celluloid or other preferred material 1 (Figure 1), approximately ten-thousandths of an inch thick, constitutes the chief element of the diaphragm. This is perforated at 2 with a rectangular slot for the purpose to be described more fully hereinafter. Two stiffening-strips 3 and 4 are then cut in the form shown in Figure 2, from paper preferably of a tough character, and approximately eight-thousandths of an inch thick. A covering-strip 5, also of celluloid or other preferred material, approximately ten-thousandths of an inch thick, is next required shaped as in Figure 3 to conform to the contour of, but slightly larger than, the strips 3 and 4 when they are assembled as shown in Figure 2. The two strips 3 and 4 are assembled on the cover 5 as shown in Figure 4, and are secured thereto by means of an adhesive such as celluloid dissolved in amyl acetate. The assembled materials are then perforated with a rectangular slot 6 corresponding to the slot 2 of the sheet 1. The members 3, 4 and 5, assembled as in Figure 4, are then applied to the sheet 1 also by means of an adhesive with the perforations 2 and 6 in register, and the sheet is then laid on a mould base-plate 7 (Figure 6) with the applied parts 3, 4 and 5 on the underside and received within a correspondingly-shaped recess formed in the mould base-plate, as shown in Figure 7. Pins 8 extending from the base-plate 7 serve to locate the assembled parts correctly in position. A strip of fibre 9 is shaped or bent as shown in Figure 5, to have a looped or re-entrant middle portion which is passed through the registering-slots 2 and 3 and is received in a corresponding and registering slot in the thickness of the base 7. Between the strip 9 and the diaphragm is a coating of adhesive and the re-entrant portion of the strip is such as approximately to fill the space of the registering slots in the diaphragm.

A domed cover 10 is then secured above the assembled parts of the diaphragm by means of bolts 11 passing through orifices provided for them in both the base and the cover. Interposed between the sheet 1 and the cover is a layer of thin sheet rubber 12.

Air is forced into the space between the cover and the rubber sheet 12 through a conduit 13 and while the air-pressure is maintained the mould is immersed into boiling water until the material of the assembled parts of the diaphragm becomes softened and excess adhesive squeezed out. The cover 5, being slightly larger than the combined strips 3 and 4, will overlap the edges of the latter and completely enclose them in conjunction with the sheet 1. Pressure is maintained at substantially 60 lbs. per square inch during the period of immersion, which period need only last for a few minutes, and the mould is then withdrawn and allowed to cool. The composite diaphragm thus formed is removed from the mould and is put aside for a few days before being re-pressed in a similar manner in another mould which, however, has its base engraved with the requisite grooves for corrugating the composite diaphragm. This second mould is diagrammatically illustrated in Figure 8, the engravings being indicated at 14. In the second pressing operation the rubber sheet 12 is dispensed with and the air-pressure applied directly to the material of the diaphragm.

In order to permit escape of air from the engravings as the material of the diaphragm is forced into them, small orifices, such as 15, are provided each leading from the base of an engraving into a chamber afforded by a dome-shaped cover 16 secured to the underside of the mould and having a main take-off conduit 17 for the removal of the air. When the mould is immersed in the heating fluid the conduits 13 and 17 discharge above the heating medium into the air so that no part of the heating medium can enter the orifices 15 or the space above the diaphragm. The same remarks apply to the use of the conduit 13 in the mould for the first pressing operation.

Figure 9 illustrates the form of the corrugations which it is found preferable to impress upon the diaphragm. These constitute a corrugation 18 round the margin of the cover 5, a circular corrugation 19 round the margin of the diaphragm, and two series of corrugations 20 and 21 struck from corresponding centres on opposite ends of a diameter of the diaphragm, one centre being preferably directly over the position at which the stylus-bar is hinged, pivoted or otherwise oscillatably mounted in the sound-box casing.

In an alternative method of carrying the invention into effect, the sheet 1 may be corrugated before the parts 3, 4, 5 and 9 are assembled thereon. In this case the assembling and pressing together of the parts of the composite diaphragm constitutes the second operation instead of the first as above described. It will be understood also that the rubber sheet 12 is used then in the second operation and not in the first.

It is found that with the process and apparatus above described the parts of the composite diaphragm become very securely adhered together and the edges of the cover 5 are smoothly pressed so as completely to encase the stiffening-strips or blades 3 and 4.

Where reference is made to an adhesive, it will be understood that this term includes also any material which will result in the adhesion or securing together of the parts of the diaphragm.

During both operations it is desirable to maintain the air-pressure in the mould at least until the parts have cooled to atmospheric temperature or to such temperature at which the celluloid or other diaphragm materials have solidified sufficiently.

The invention is also applicable to diaphragms formed of two or more layers of material of other shapes than those illustrated. For example, the parts 3 and 4 could be replaced by a single strip weakened at or near one extremity in relation to the strength or stiffness of the rest of it, with the stylus-bar connected where the weakened and less weakened portions merge into one another. Instead of weakening a portion of the strip, that end of it which extends in the direction of and beyond the inner end of the stylus-bar may be relatively shorter than the remainder, or the strip may be formed in any other manner which will effect the same object, namely cause the end of the strip, where it is connected to the stylus-bar, to tend to move along the same arc as that over which the inner end of the stylus-bar itself moves.

The looped or re-entrant portion of the strip 9 is severed where it projects beyond the surface of the cover 5 and constitutes thereby two lugs between which the inner end of the stylus-bar may be secured in the manner described for example in my co-pending patent application Ser. No. 514,592, filed November 12, 1921. The parts of the strip which overlie and are secured to the diaphragm constitute an additional stiffening-strip extending in a direction transverse to the length of the stylus-bar and so disposed as to overlie that portion of the blades or strips 3 and 4 to which the stylus-bar is connected.

It is found that by corrugating the diaphragm with the two separate series of corrugations, as illustrated in Figure 9, an increased and desirable flexibility is afforded to the diaphragm. The invention, therefore, also includes a diaphragm whether built up as described or otherwise formed.

Obviously the mould may be of any other desired form and it may be made of such size as to operate at the same time on two or more diaphragms arranged side-by-side in the mould. Moreover, it is immaterial whether the pressure is applied before or after the introduction of the mould into the heating fluid. Instead of immersing the mould in a fluid bath it may be heated in any other preferred manner, for example in an oven.

It will be obvious that the invention is applicable to the formation of any form of built-up or other diaphragm, whereof the material can be softened by the application of heat to a degree at which it can be moulded.

In the event of an un-corrugated diaphragm being required the step of forming the corrugations would be omitted and the pressure-step for securing the parts of the composite diaphragm would alone be employed.

The purpose of the strips 3 and 4 is similar to that of the corresponding strips described in my patent application Ser. No. 479,379.

What I claim as my invention and desire to secure by Letters Patent is:—

1. A composite diaphragm of the kind described, comprising an elongated stiffening blade extending lengthwise along a diameter of the diaphragm and enclosed between two sheets of flexible material, one of which constitutes the main diaphragm disc and the other constitutes a cover sheet for the stiffening blade and is shaped to conform to the contour of said blade and to overlap the margins thereof.

2. A composite diaphragm of the kind described, comprising an elongated stiffening blade extending lengthwise along a diameter of the diaphragm and enclosed between two sheets of flexible material, one of which constitutes the main diaphragm-disc, and an additional stiffening strip superimposed on one of the two flexible sheets aforesaid and overlying that portion of the main stiffening blade to which the stylus-bar is connected.

3. A composite diaphragm of the kind described, comprising an elongated stiffening blade extending lengthwise along a diameter of the diaphragm and enclosed between and adhesively affixed directly to each of two sheets of flexible material, one of which constitutes the main diaphragm disc and the other constitutes a cover sheet for the stiffening blade and is shaped to conform to the contour of said blade and to overlap the margins thereof, and an additional stiffening strip superimposed on one of the two flexible sheets aforesaid and overlying that portion of the main stiffening blade to which the stylus-bar is connected.

In testimony whereof I affix my signature.

WILLIAM ERNEST CLIFTON.